INVENTORS
GORDON J. LeBRASSE
BONIFACE D. STOLARSKI

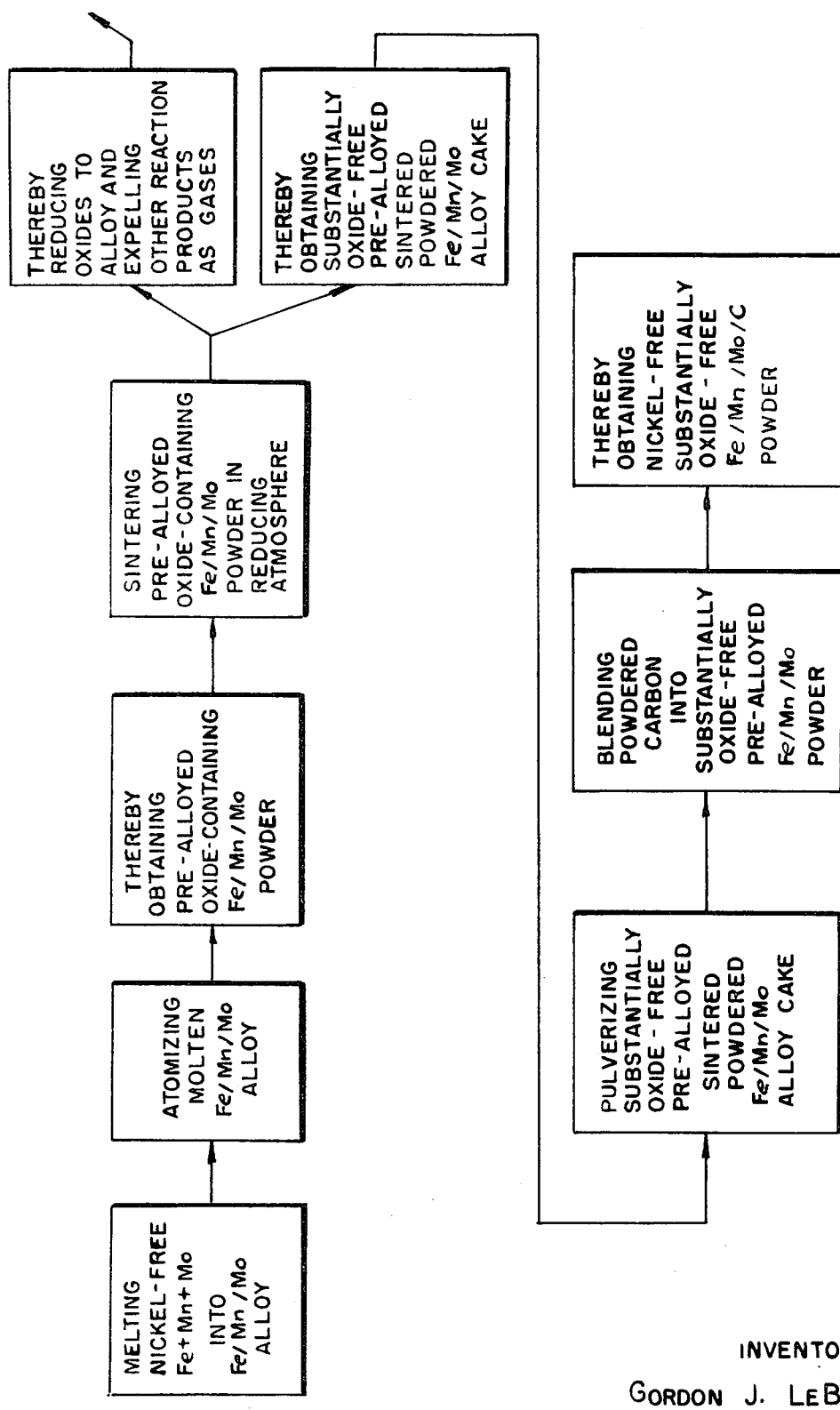

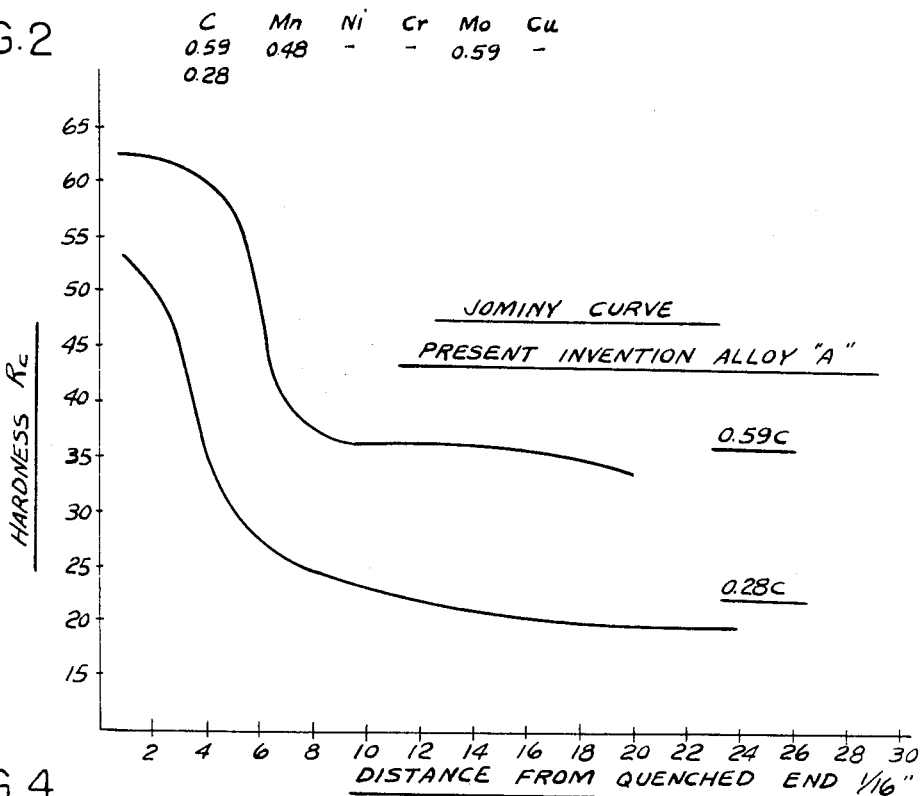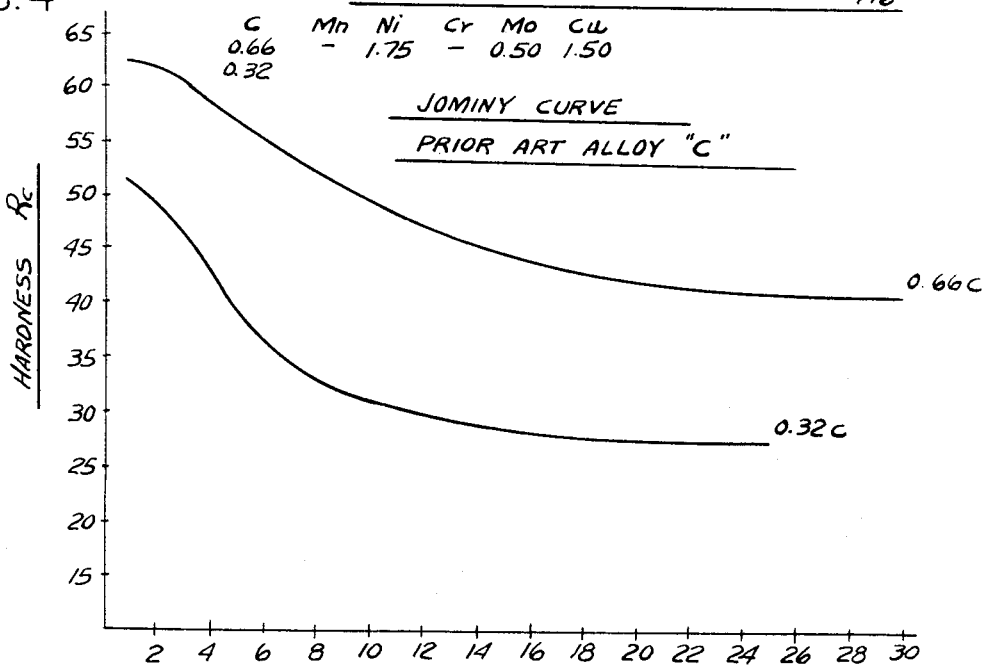

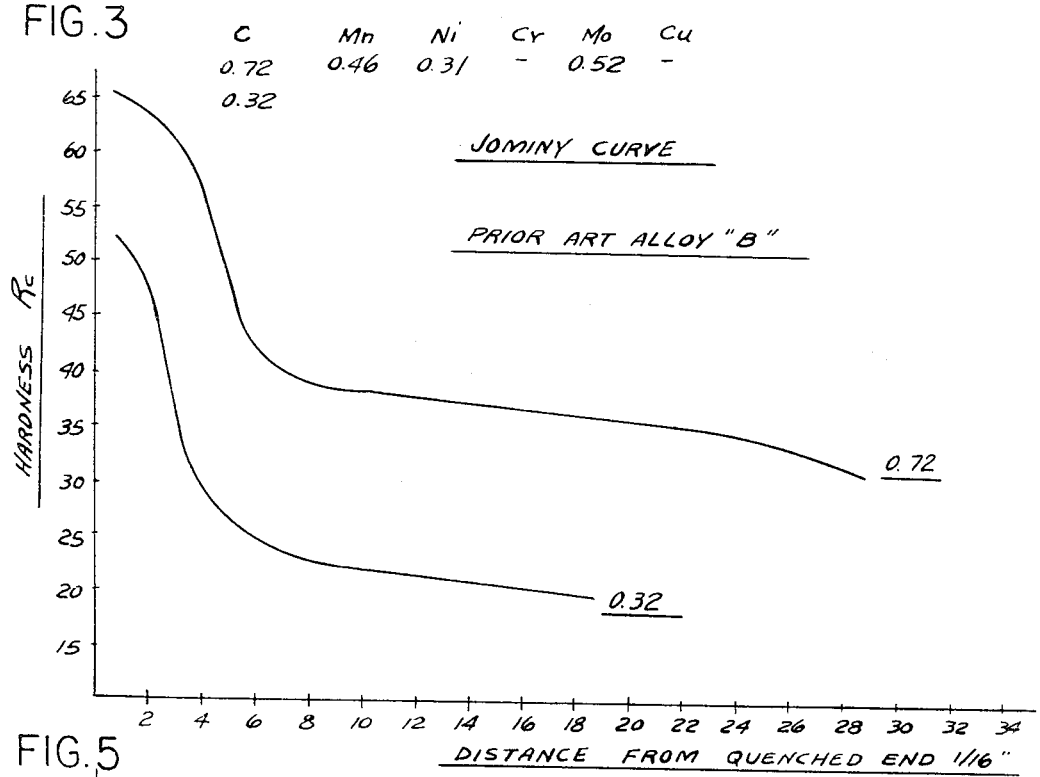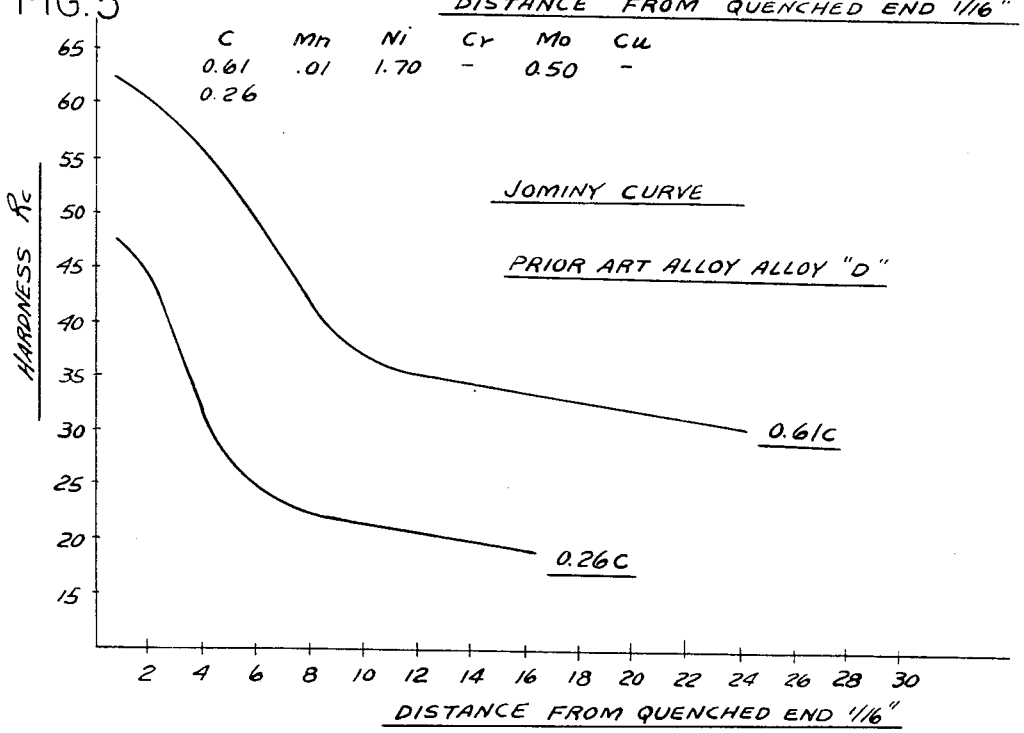

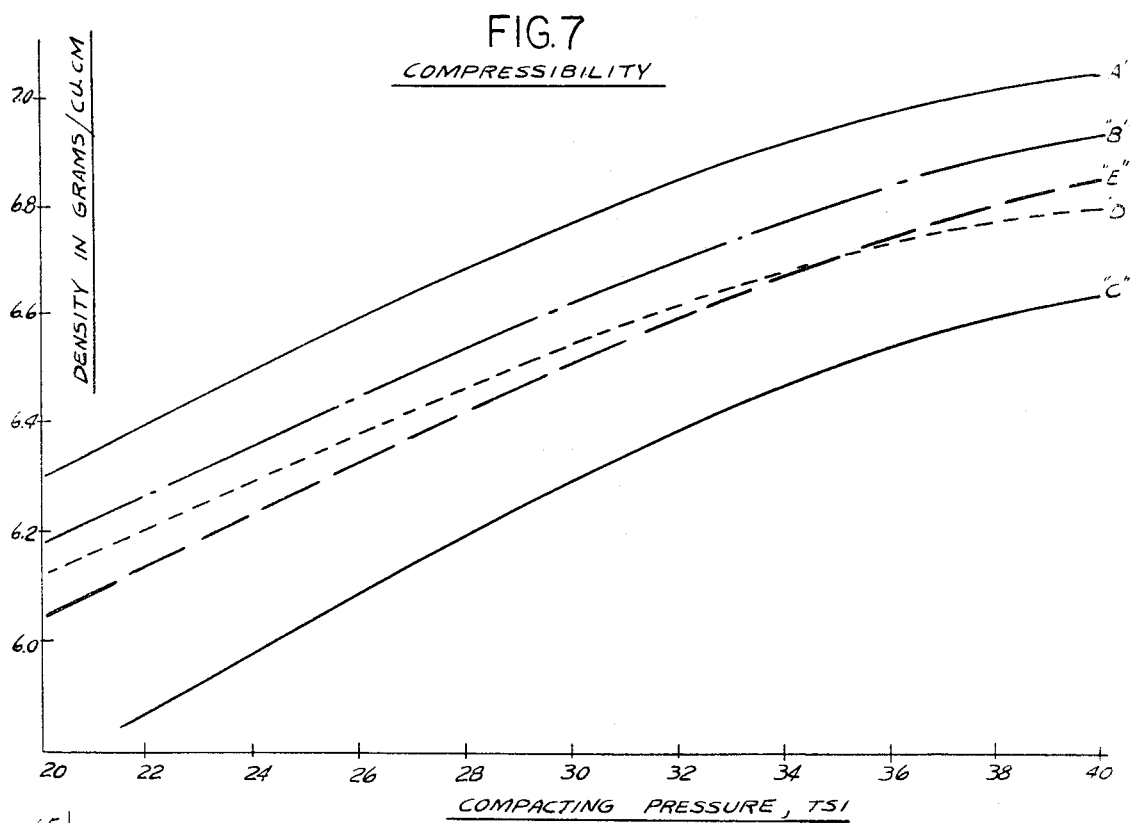
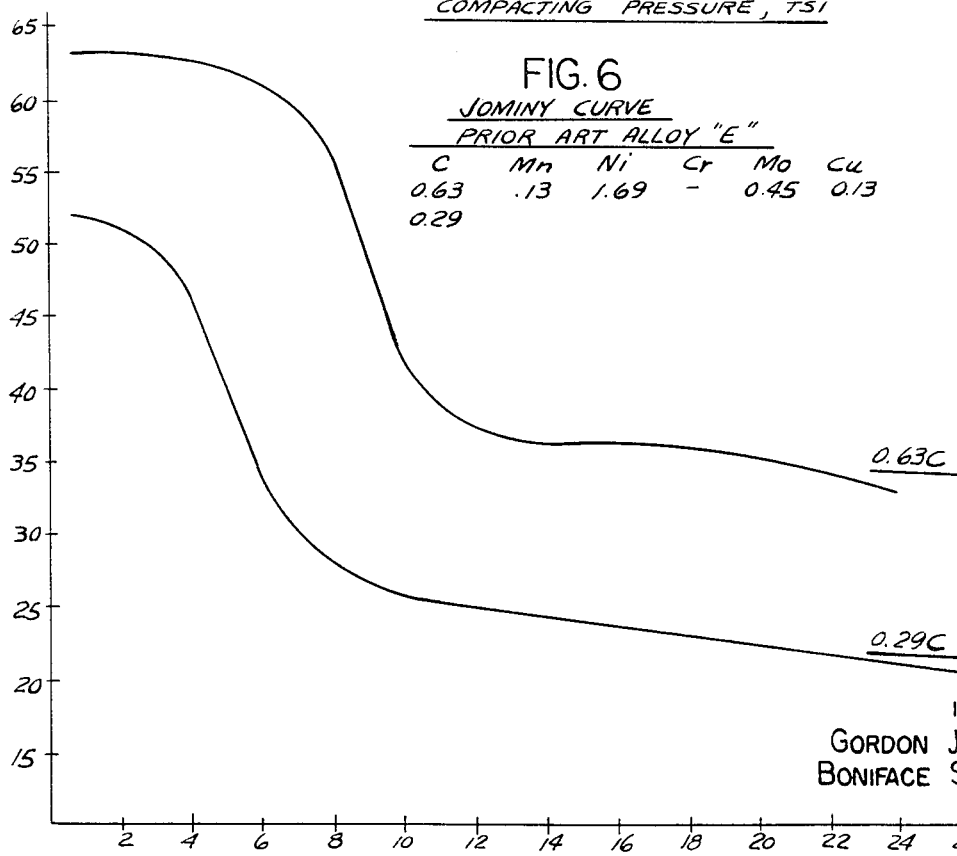

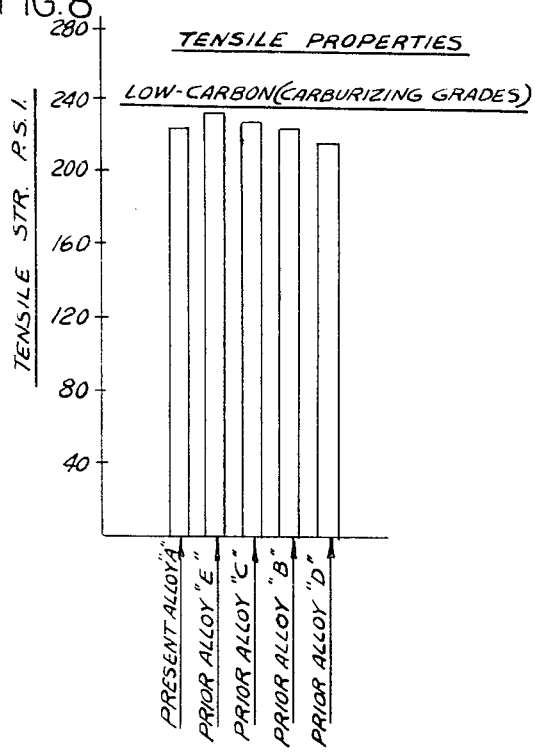
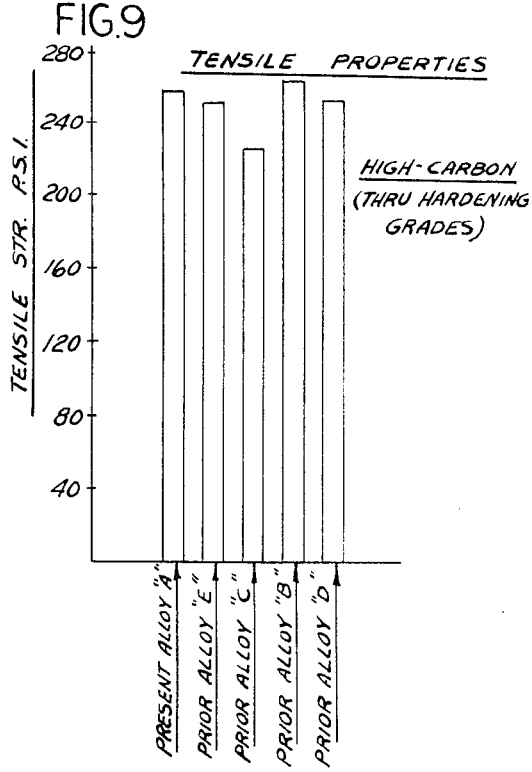
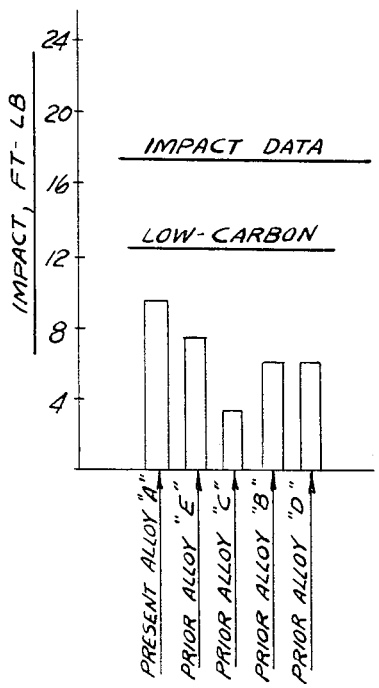
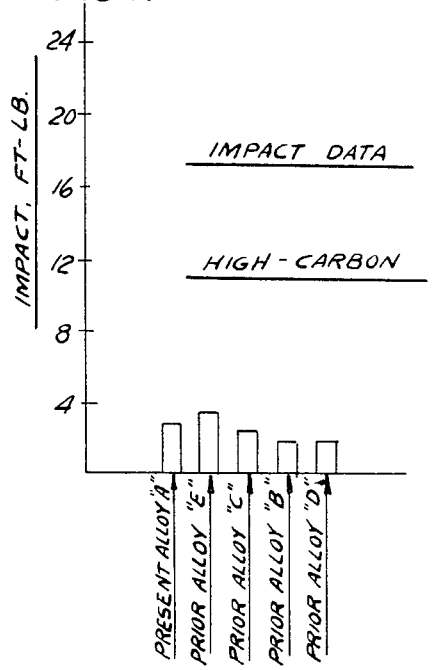

BY Barthel & Bugbee

ATTORNEYS

United States Patent Office 3,676,103
Patented July 11, 1972

3,676,103
PRE-ALLOYED NICKEL-FREE SILICON-FREE MINIMAL-OXIDE LOW-ALLOY IRON POWDER AND METHOD OF MAKING THE SAME
Gordon J. Le Brasse, Ann Arbor, and Boniface Stolarski, Grosse Pointe Woods, Mich., assignors to Federal-Mogul Corporation, Southfield, Mich.
Filed Feb. 17, 1971, Ser. No. 115,994
Int. Cl. B22d 23/08; B22f 9/00
U.S. Cl. 75—.5 BA                 9 Claims

ABSTRACT OF THE DISCLOSURE

A pre-alloyed nickel-free silicon-free low-alloy iron powder with minimal oxide content yet possessing good hardenability and good mechanical and metallurgical properties for the production of sintered powdered metal articles is prepared by alloying iron with approximately one-half of one percent molybdenum and approximately one-half of one percent of manganese. Any desired carbon content is obtained either by combining carbon with the molten alloy prior to atomization or by adding graphite thereafter to the pre-alloyed powder by blending prior to compacting. The detrimental oxides normally created during the production of these compactible metal powders by the high temperature atomization of the molten metal from which they are formed are reduced to negligible amounts having harmless effects by passing the pre-alloyed powder through a sintering furnace containing a reducing atmosphere, such as a hydrogen or dissociated ammonia gas atmosphere. The sintered powdered alloy cake thus produced is then pulverized to form the alloy powder of the present invention. Comparative tests described, and their results set forth herein, show that the present invention alloy powder, although omitting the nickel content previously thought necessary, nevertheless retains the functions of, and compares favorably in performance with the prior nickel-content iron alloy powders.

BACKGROUND AND SUMMARY OF INVENTION

In the powder metallurgy industry a "low-alloy" iron powder is one in which the alloy ingredients total less than three percent. Prior low-alloy powders having good hardenability and good mechanical properties have hitherto been prepared by blending or alloying manganese, nickel and molybdenum powders in amounts of approximately one-half of one percent each, the remainder being iron containing the desired amount of carbon. Nickel powder, however, is very expensive and in short supply, and the temporary cutting off of the supply of nickel, as by labor strikes, has hitherto created havoc in the powder metallurgy industry. The manganese ingredient is very desirable for facilitating heat treating because it renders hardening easier. Manganese, however, possesses the very serious disadvantage of easily oxidizing, which has hitherto prevented it from being supplied to makers of powdered metal parts because of the fact that such oxidation impregnates such parts with particles of oxides of manganese. Iron, molybdenum and silicon also form oxides when melted and atomized. These oxides contaminate the alloy by acting as foreign bodies, which in turn create an irregular metallurgical microstructure. The presence of such oxides in such a sintered powdered metal alloy makes it hard to handle, and greatly reduces the elongation, impact and compressibility properties. Silicon has hitherto been frequently added to the molten alloy to increase the fluidity of the alloy so as to improve its atomization characteristics, but silicon when oxidized forms acid insolubles, and, therefore, undesirable silica. These undesired oxides and foreign matter are termed "dirt" in the powdered metal industry.

Thus the well-known prior silicon-content S.A.E. 4400 iron alloy powder which the iron alloy powder of the present invention is intended to replace, has the following composition:

|  | Percent |
| --- | --- |
| Manganese | 0.45–0.65 |
| Silicon | 0.20–0.35 |
| Molybdenum | 0.45–0.60 |

Remainder iron, plus carbon to suit.

Furthermore, the also well-known prior nickel-content S.A.E. 4600 iron alloy powder which the alloy powder of the present invention is likewise intended to replace, has the following nominal composition:

|  | Percent |
| --- | --- |
| Manganese | 0.20 |
| Nickel | 1.75 |
| Molybdenum | 0.25 |

Remainder iron, plus carbon to suit.

The pre-alloyed nickel-free silicon-free minimal-oxide low-alloy iron powder of the present invention, containing manganese alloyed and molybdenum in amounts of one-half percent each, with iron and carbon to give the desired composition, and prepared as set forth below under deoxidizing conditions, eliminates the above-mentioned shortcomings of prior low-alloy iron powders without the use of either nickel or silicon, and reduces the detrimental oxides to a minimum while achieving a superior metallurgical micro-structure demonstrated by photomicrographs herein comparing it with prior art alloys. Extensive tests, described below and with the results thereof either set forth graphically in the drawings hereof or in tabular form below, show that the pre-alloyed nickel-free silicon-free minimal-oxide low-alloy iron powder "A" of the present invention, made in accordance with the method described below the present invention, when tested in comparison with much more expensive prior nickel-content iron alloys, exhibit properties which for the most part equal and in some cases surpass the similar properties of such prior nickel-content iron alloys. In other words, the nickel-free, silicon-free iron alloy powder of the present invention, although omitting the nickel ingredient previously considered necessary for imparting satisfactory physical and chemical properties to such iron alloy powders, nevertheless retains such properties to such a satisfactory extent that it may be successfully substituted for the prior nickel-content alloy powders for most uses.

In the drawings, in which the present invention iron alloy powder is designated "A" and typical prior commercial nickel-content iron alloy powders are designated "B," "C," "D" and "E" respectively for comparative purposes, FIG. 1 is a flow sheet showing diagrammatically the steps in the method of making the nickel-free silicon-free minimal-oxide pre-alloyed iron powder "A" of the present invention;

FIG. 2 is a graph showing Jominy hardness test curves of the nickel-free silicon-free minimal-oxide pre-alloyed iron powder "A" of the present invention;

FIG. 3 is a graph showing Jominy hardness test curves of prior nickel-content alloy powder "B";

FIG. 4 is a graph showing Jominy hardness test curves of prior nickel-content and copper-content alloy powder "C";

FIG. 5 is a graph showing Jominy hardness test curves of prior nickel-content alloy powder "D";

FIG. 6 is a graph showing Jominy hardness test curves of prior nickel-content alloy powder "E";

FIG. 7 is a graph showing comparative compressibility curves of the alloy powder "A" of the present invention and of prior alloy powders "B," "C," "D" and "E";

FIG. 8 is a graph showing comparative tensile test properties of the low-carbon iron alloy powder "A" of the present invention, and prior low-carbon alloy powders "B," "C," "D" and "E";

FIG. 9 is a graph showing comparative tensile test properties of the high-carbon iron alloy powder "A" of the present invention and prior high-carbon alloy powders "B," "C," "D" and "E";

FIG. 10 is a graph showing comparative Charpy impact test properties of the low-carbon iron alloy powder "A" of the present invention, and prior high-carbon alloy powders "B," "C," "D" and "E";

FIG. 11 is a graph showing comparative Charpy impact test properties of high-carbon iron alloy powder "A" of the present invention, and prior low-carbon powders "B," "C," "D" and "E";

Figure 15:
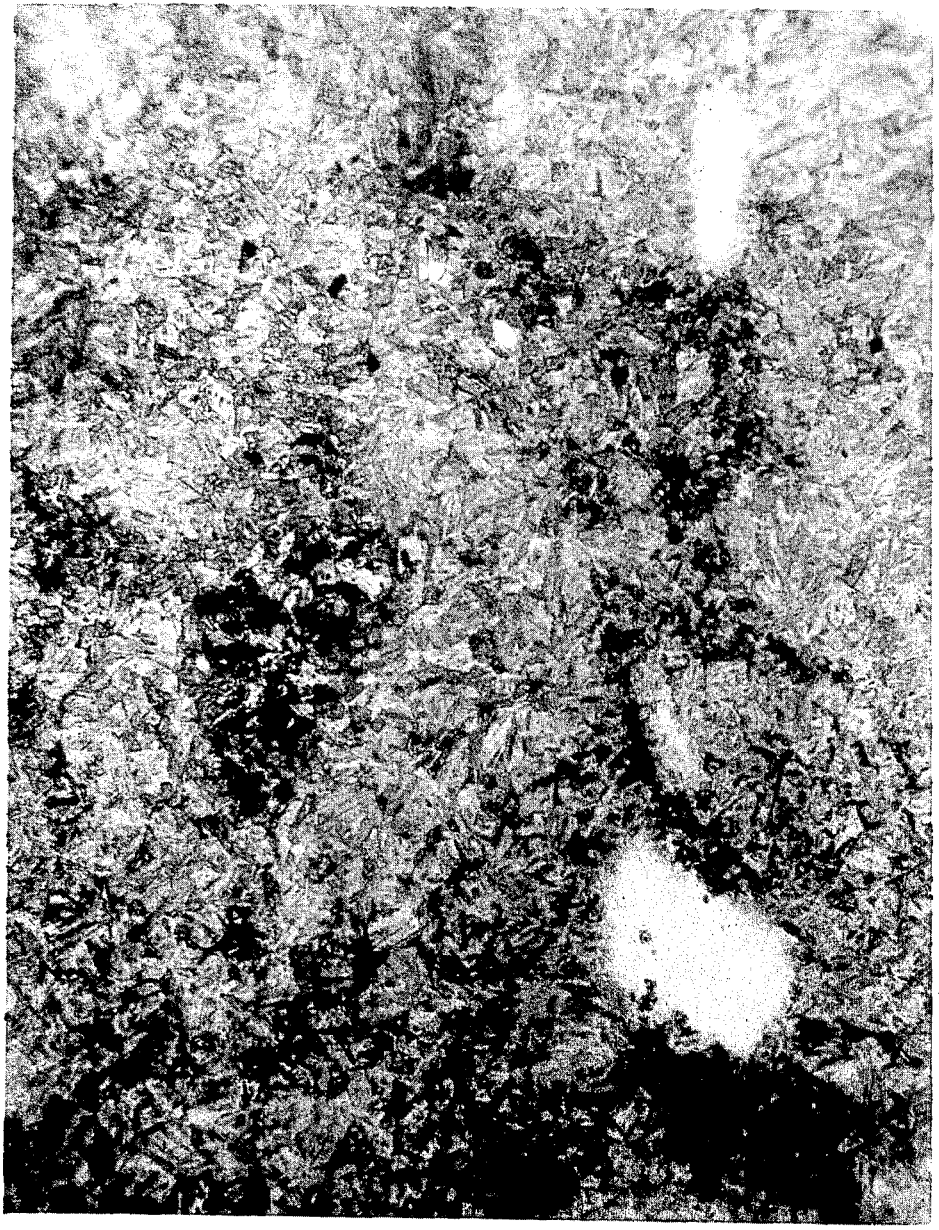
Figure 16:
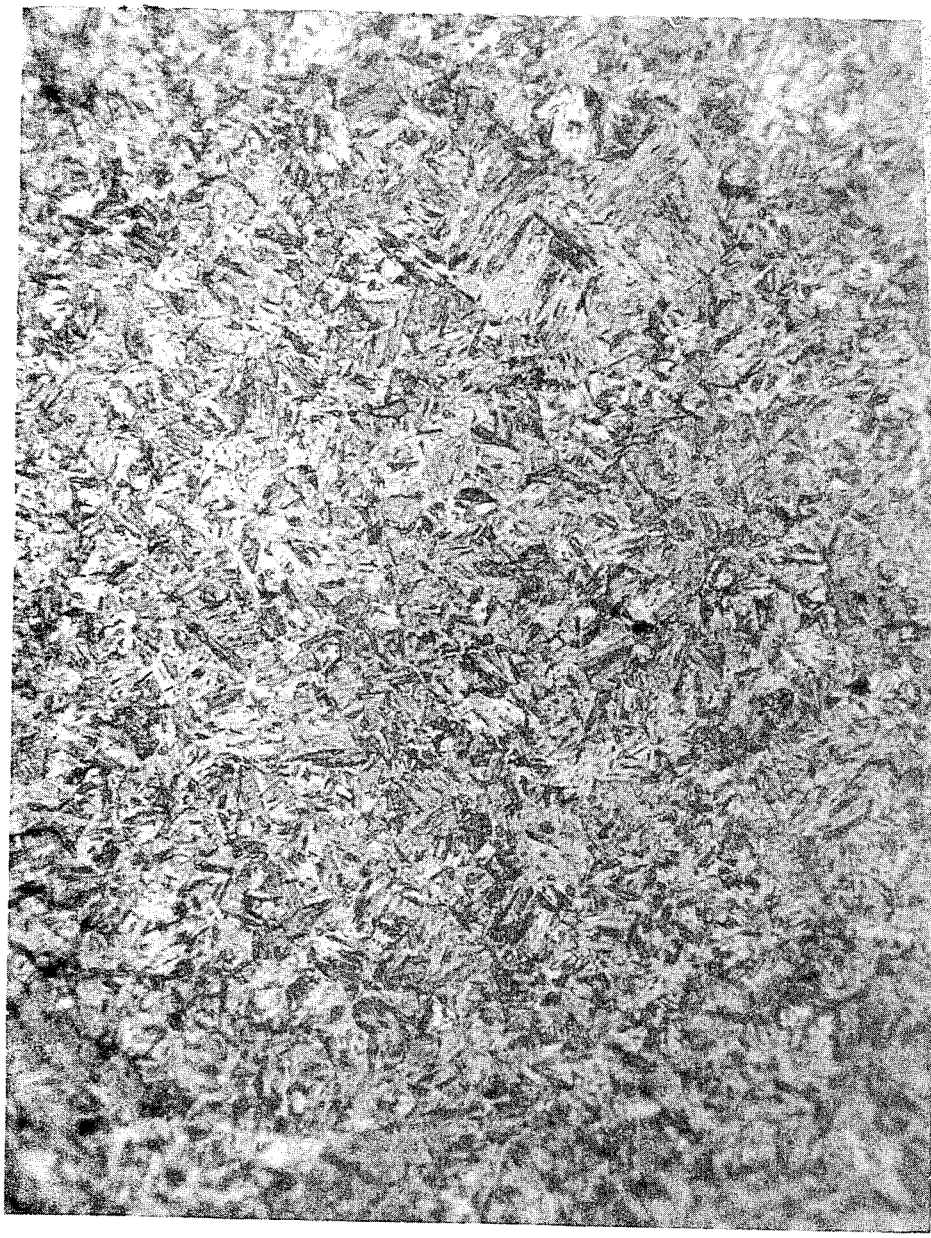

FIG. 15 is a photomicrograph of a low-carbon heat-treated similarly-etched sintered powdered metal sample made from prior nickel-content iron alloy powder "D," also under 300 diameter magnification; and FIG. 16 is a photomicrograph of a low-carbon heat-treated similarly-etched sintered powdered metal sample made from prior nickel-content iron alloy powder "E," also under 300 diameter magnification.

METHOD OF PREPARING LOW-ALLOY NICKEL-FREE IRON POWDER OF PRESENT INVENTION

In preparing the pre-alloyed nickel-free silicon-free minimal-oxide low-alloy iron powder of the present invention (FIG. 1), iron is melted in a suitable furnace. While the iron is in a molten state, manganese metal and molybdenum metal are added to the molten iron, which now contains the proper quantities of manganese and molybdenum. This alloy in the molten state is then discharged through a suitable nozzle while subjected to the action of high pressure fluid such as pressurized steam or other suitable pressurized fluid which converts the molten metal into a pre-alloyed metal powder. Each particle of this pre-alloyed metal powder contains the same ratio of iron, manganese and molybdenum. Such metal atomizing nozzles are shown, for example, in the Robert L. Probst et al. Pats. Nos. 2,968,062 of Jan. 17, 1961 and 3,253,783 of May 31, 1966, and the procedure is set forth in an article thereon in the journal "Precision Metal Molding" for February 1959. This pre-alloyed powder is passed through a suitable furnace containing a reducing atmosphere such as hydrogen or dissociated ammonia, which removes objectionable oxides.

The pre-alloyed iron powder of the present invention, in response to the heat of the sintering temperature, emerges from the furnace in the form of a sintered powdered alloy cake, the particles of which are tenaciously joined to one another. The sintering temperature employed in the de-oxidation procedure just mentioned is in the neighborhood of 1800 degrees F. with an acceptable range of 1400 to 2000 degrees F.

It will be understood that during the reduction step after atomization of the molten alloy, the alloy oxides are reduced to their respective metals while the other reaction products are expelled in gaseous form. Thus where the atmosphere is hydrogen, the other reaction product is water vapor.

The sintered powdered iron alloy cake thus produced is then allowed to cool, whereupon it is then pulverized, as by grinding, which reduces it to fine particles which, unlike the approximately spherical particles produced during rlkede'tedeu.inrdgign,
atomization, are of non-spherical configuration. As a result, when the nickel-free silicon-free minimal-oxide pre-alloyed iron powder of the present invention is compacted into briquettes in a conventional briquetting press, the particles interlock with one another and because of their irregular shape adhere tenaciously to one another, with the result that the briquettes and the sintered powdered metal alloy particles made therefrom are found by comparative tests to possess mechanical properties which are in most cases equal or superior to those of articles made from prior nickel-content iron alloy powders.

COMPARATIVE TESTS OF PRESENT PRE-ALLOYED NICKEL-FREE LOW-ALLOY IRON POWDER WITH PRIOR NICKEL-CONTENT PRE-ALLOYED IRON POWDERS

For comparative purposes, sintered powdered test samples of the pre-alloyed nickel-free low-alloy iron powder "A" of the present invention and of prior commercial nickel-content low-alloy iron powders "B," "C," "D" and "E" were made use of. The exact chemical composition of the samples tested was determined by chemical analysis and is shown in Table I below:

TABLE I

Chemical Composition

| Material | Hi-C | Lo-C | Mn | Ni | Mo | Cu |
|---|---|---|---|---|---|---|
| Present invention nickel-free iron alloy powder "A" | 0.59 | 0.28 | 0.48 | | 0.59 | |
| Prior nickel-content iron alloy powder "E" | 0.63 | 0.29 | 0.13 | 1.69 | 0.45 | 0.13 |
| Prior nickel-content iron alloy powder "C" | 0.66 | 0.32 | | 1.75 | 0.50 | 1.50 |
| Prior nickel-content iron alloy powder "B" | 0.72 | 0.32 | 0.46 | 0.31 | 0.52 | |
| Prior nickel-content iron alloy powder "D" | 0.61 | 0.26 | | 1.70 | 0.50 | |

The five iron alloy powders were then tested for apparent density and relative rates of flow, with the results shown in Table II below.

TABLE II

Apparent density and flow rate

| Material | Apparent density, b./cc. | Flow rate, sec. |
|---|---|---|
| Present invention nickel-free iron alloy powder "A" | 2.53 | 34 |
| Prior nickel-content iron alloy powder "E" | 2.94 | 27 |
| Prior nickel-content iron alloy powder "C" | 2.79 | 34 |
| Prior nickel-content iron alloy powder "B" | 3.22 | 24 |
| Prior nickel-content iron alloy powder "D" | 2.77 | 34 |

The five iron alloy powders were then formed into similar briquettes in the form of MPIF Standard 10–63 flat tensile bars, the compacting being carried out at 30 tons per square inch. Comparative compressibility tests of the five iron alloy powders "A," "B," "C," "D" and "E" were also made and the results thereof are shown in FIG. 7.

Samples of each of the five iron alloy powders in the form of green briquettes were tested as regards their green strength, at a compacting pressure of 32 tons per square inch. The comparative results are shown in Table III below, based upon an average of three samples each being tested.

TABLE III

Green strength (at 32 t.s.i. compacting pressure)

Material: Green strength, p.s.i.
Present invention nickel-free iron alloy powder
"A" _____ 1764
Prior nickel-content iron alloy powder "E" ___ 1535
Prior nickel-content iron alloy powder "C" ___ 2100
Prior nickel-content iron alloy powder "B" ___ 1218
Prior nickel-content iron alloy powder "D" ___ 1855

Two sets of the above-identified flat tensile bars compacted at 30 tons per square inch each were sintered under the typical conditions shown in Table IV below. The bars of alloys "A" and "E" were sintered together, as shown in the upper portion of Table IV. Prior alloy powders "B," "C" and "D," which arrived later in the test program were sintered as shown in the middle and lower portions of Table IV, under conditions as similar as possible to those of alloy powders "A" and "E."

TABLE IV

Sintering conditions for present invention alloy powder "A" and for prior alloy powder "E"

| | |
|---|---|
| Pre-heat zone temp. | 1500° F. |
| Hot zone #1 | 2050° F. |
| Hot zone #2 | 2050° F. |
| Atmosphere | Endothermic gas. |
| Dew point (hot zone) | +40°/42° F. |
| Speed setting | #8. |

Sintering conditions for prior alloy powders "B" and "C"

| | |
|---|---|
| Pre-heat zone temp. | 1500° F. |
| Hot zone #1 | 2050° F. |
| Hot zone #2 | 2050° F. |
| Atmosphere | Endothermic gas. |
| Dew point (hot zone) | +37°/39° F. |
| Speed | 2 min./ft. |

Sintering conditions for prior alloy powder "D"

| | |
|---|---|
| Pre-heat zone temp. | 1200° F. |
| Hot zone #1 | 1900° F. |
| Hot zone #2 | 2040° F. |
| Atmosphere | Exo/endo gas. |
| Dew point (generator) | 32° F. |
| Speed | 2.5 min./ft. |

One set of the bars was reserved for testing in the low density or "as sintered" condition, while the bars of the other set were heat-treated together. The heat treatment data for the low-density samples are given below in Table V.

TABLE V

Heat treatment, low density samples

| | |
|---|---|
| Temperature | 1550° F. |
| Time | 45 min. |
| Atmosphere | Endothermic gas. |
| Dew point | +45°/50° F. |
| Quench | Warm oil. |
| Temper | 300° F.—1 hour. |

Both sets of bars were surface-ground to insure flatness, and then were tension-tested. The comparative results of these tension tests of the low-carbon specimens are listed in Table VI entitled "Low Density Evaluation":

of certain of the prior test materials being sintered separately because, as stated above, the powders of which they were made had arrived later on in the program.

These bars were then sufficiently heated and forged into test bars by being struck with a single blow at a suitable forging pressure.

The density of these test bars ranged after forging from 98.2% theoretical for the more difficult forging materials to 99.6% theoretical for the more easily forged materials. The bars after forging were then passed through a normalizing chamber filled with an atmosphere of commercial endothermic gas, which is a product obtained by cracking natural methane gas. The forged bar size was approximately 0.750 inch by 0.750 inch by 3 inches. These bars were rough-turned to produce a round tensile bar with grind stock allowance. Heat treatment of these rough bars was then performed separately on the low-carbon and high-carbon sets under the heat-treatment conditions set forth in Table VII.

TABLE VII

Heat treatment, high density samples (A) Low carbon group:

| | |
|---|---|
| Temperature | 1575° F. |
| Time | 1 hour. |
| Atmosphere | Endothermic gas. |
| Dew point | +60° F. |
| Quench | Warm oil. |
| Temper | 300° F.—1½ hours. |

(B) High carbon group:

| | |
|---|---|
| Temperature | 1550° F. |
| Time | 1 hour. |
| Atmosphere | Endothermic gas. |
| Dew point | +42°/44° F. |
| Quench | Warm oil. |
| Temper— | |
| Group a | 300° F. for 1½ hours. |
| Group b | 300° F. for 1½ hours +600° F. for 1 hour. |

One set of bars from each group of forged bars was also machined into Jominy hardenability test samples. These Jominy test samples were furnace-heated and quenched in a new Jominy unit in accordance with S.A.E. Standard J-406a. Rockwell hardness readings were taken at 1/16 of an inch intervals in the customary manner prescribed for Jominy hardenability tests. The results for the present invention alloy "A" are shown in FIG. 2 whereas the results for prior alloys "B," "C," "D" and "E" are shown in FIGS. 3, 4, 5 and 6 respectively.

Certain of these forged bars were also used to produce Charpy V-notch specimens in accordance with A.S.T.M. specifications E-23. After rough machining,

TABLE VI

Low density evaluation

| | | As sintered | | Heat treated | | | |
|---|---|---|---|---|---|---|---|
| Material | Density at 30 t.s.i. | Tens. str., p.s.i. | Percent elong. | Tens. str., p.s.i. | Percent elong. | App. hard., R₀ | Percent carbon |
| Present invention nickel-free alloy "A" | 6.78 | 56,300 | 2 | 98,100 | 1 | 36/39 | .60 |
| Prior nickel-content alloy "E" | 6.40 | 54,200 | 1 | 86,000 | 1 | 33/34 | .78 |
| Prior nickel-content alloy "C" | 6.34 | 51,000 | 1 | 81,300 | 1 | 30/35 | .74 |

NOTE.—All of the above powders were prepared with 0.70% graphite. Prior nickel-content alloys "B" and "D" were not available for this test.

In order to evaluate the five iron alloy powders comparatively at high density, green bars weighing 218 grams and approximately 0.650 inch wide by 1.0 inch high by 3.0 inches long were compacted from each powder at 30 tons per square inch pressure. The bars of each alloy powder were made in both low carbon (0.3% graphite) and high carbon (0.7% graphite) mixes to simulate carburizing and through-hardening type materials. The bars were then sintered as shown in Table IV above, the bars these bars accompanied the above-described tensile test bar specimens through heat treatment according to the conditions set forth in Table VII mentioned above. Final grinding and Charpy impact testing was then performed. The results of the comparative tensile tests for the low-carbon specimens are shown in FIG. 8 whereas those for the high-carbon specimens are shown in FIG. 9. The impact test data for the low-carbon specimens are shown in FIG. 10 whereas those of the high-carbon specimens are shown in FIG. 11. The comparative results of the various tests of the high-density specimens are listed in Table VIII both for low-carbon and high-carbon specimens:

TABLE VIII
High Density Evaluation

| Material | Tens. str., p.s.i. | Percent elong. | Hardness, $R_c$ | Charpy impact, ft./lb. | Hardness, $R_c$ | Percent carbon |
|---|---|---|---|---|---|---|
| 1. Low carbon (average of 3 samples each): | | | | | | |
| Present invention nickel-free iron alloy "A" | 222,900 | 7.0 | [1] 45-50 | 9.2 | 49-50 | 0.28 |
| Prior nickel-content iron alloy "E" | 235,500 | 8.0 | 48-50 | 7.6 | 47-49 | 0.29 |
| Prior nickel-content iron alloy "C" | 229,300 | 3.0 | 46-48 | 3.5 | 49-50 | 0.32 |
| Prior nickel-content iron alloy "B" | 225,400 | 4.5 | 47-50 | 5.9 | 47-48 | 0.32 |
| Prior nickel-content iron alloy "D" | 218,200 | 5.0 | 44-45 | 5.9 | 44-45 | 0.26 |
| 2. High carbon (average of 7 samples each): | | | | | | |
| Present invention nickel-free iron alloy "A" | 260,400 | 4.2 | [2] 49-50 | 2.8 | 60-62 | 0.59 |
| Prior nickel-content iron alloy "E" | 253,800 | 5.0 | 48-49 | 3.3 | 58-61 | 0.63 |
| Prior nickel-content iron alloy "C" | 223,600 | 1.2 | 48-50 | 2.3 | 58-60 | 0.66 |
| Prior nickel-content iron alloy "B" | 264,700 | 1.5 | 49-51 | 1.8 | 61-63 | 0.72 |
| Prior nickel-content iron alloy "D" | 254,400 | 2.2 | 47-49 | 1.8 | 59-60 | 0.61 |

[1] Hardness and properties after 300° F. temper.
[2] Hardness and properties after 600° F. temper.

NOTE.—Figures shown are average of all specimens tested.

The specimens or samples which were left from the tensile tests were then used for micro-examination for comparative cleanliness. The results of the cleanliness examination are set forth below in Table IX:

TABLE IX
Microexamination

Prepared samples from each group of test specimens were examined with the following observations:

Unetched examination (for cleanliness):

| | |
|---|---|
| Present invention nickel-free iron alloy "A". | Contains a fair amount of oxides or non-metallics. |
| Prior nickel-content iron alloy "E". | Contains a fair amount of large dark gray particles. |
| Prior nickel-content iron alloy "C". | Very dirty, large amount of both fine and coarse non-metallics and oxides. |
| Prior nickel-content iron alloy "B". | Appears to contain fine scattered silicate-type inclusions. |
| Prior nickel-content iron alloy "D". | Moderate amount of medium size dark gray non-metallics. |

The remaining specimens reserved for microexamination were subjected to nital etching and photomicrographs thereof were made under a magnification of 300 diameters. These photomicrographs for the present invention alloy and the prior art alloys are shown in FIGS. 12 to 16 inclusive. A comparative discussion of the micro-examination of these etched specimens as regards their microstructure is given below in Table X.

TABLE X
Microexamination

Etched examination (for microstructure):

| | |
|---|---|
| Present invention nickel-free iron alloy "A". | Good transformed structure. |
| Prior nickel-content iron alloy "E". | Very uniform good structure. |
| Prior nickel-content iron alloy "C". | Mixture of martensite and nickel-rich areas. |
| Prior nickel-content iron alloy "B". | Good structure with some transformation product. |
| Prior nickel-content iron alloy "D". | Martensite structure plus scattered nickel-rich areas and transformation product. |

SUMMARY OF TEST FINDINGS

The comparative tests of specimens made from the nickel-free silicon-free minimal-oxide pre-alloyed iron powder "A" with those of the nickel-content prior iron alloy powders "B," "C," "D" and "E" support the following conclusions:

(1) All things considered, the pre-alloyed nickel-free-silicon-free minimal oxide low-alloy iron powder of the present invention shares the highest rating, by comparison, with the prior nickel-content iron alloy powder "E," with the result that the iron alloy powder of the present invention could be substituted in applications which now use the prior nickel-content iron alloy powder "E," not only as to conventional density sintered powdered metal parts but also as to subsequently forged high-density sintered powdered metal parts.

(2) As regards compressibility, flow rate and green strength, the nickel-free iron alloy powder "A" of the present invention compares favorably with the four prior nickel-content iron alloy powders.

Figure 12:
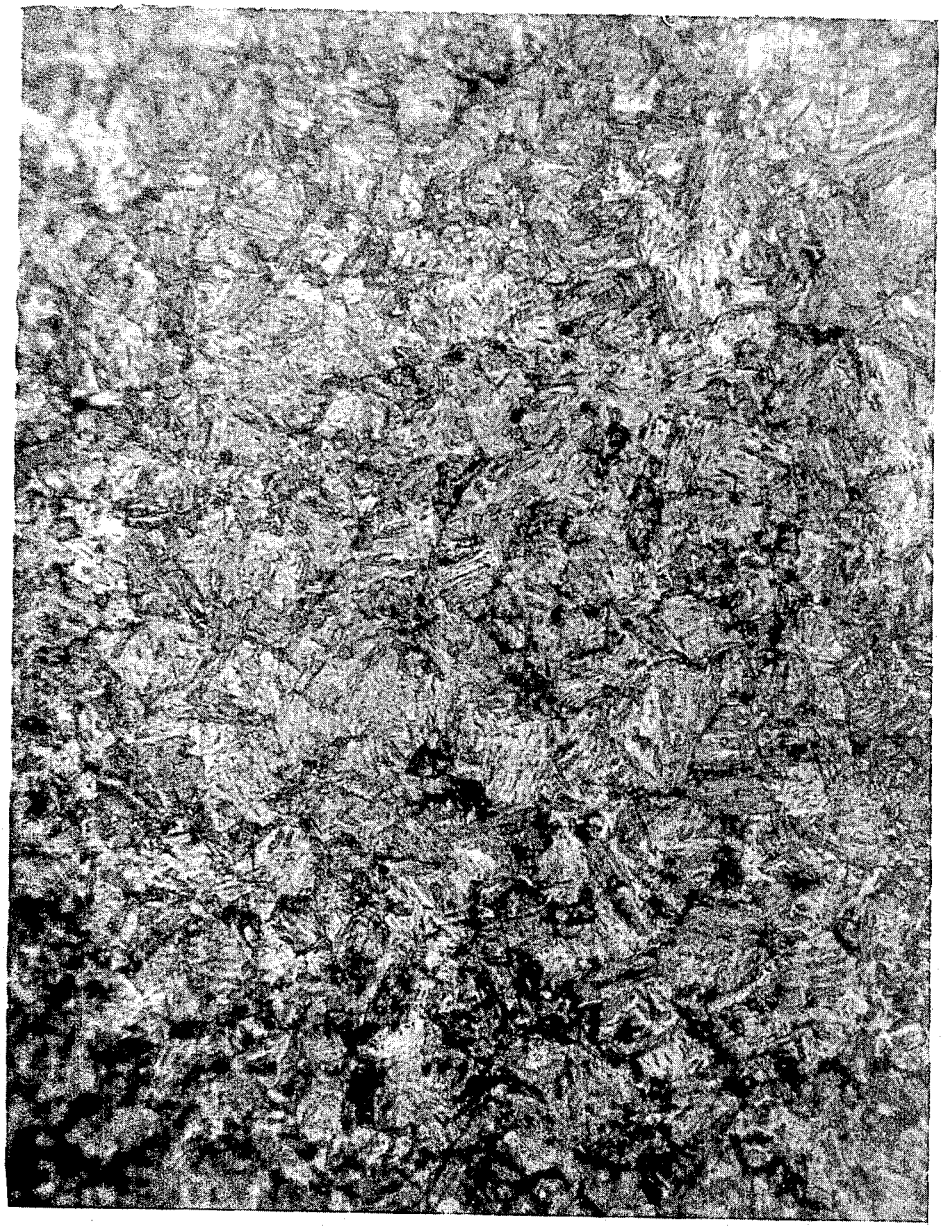
FIG. 12 is a photomicrograph of a low-carbon heat-treated nital-etched sintered powdered metal sample made from the nickel-free silicon-free minimal-oxide prealloyed iron powder "A" of the present invention, under 300 diameter magnification.
Figure 13:
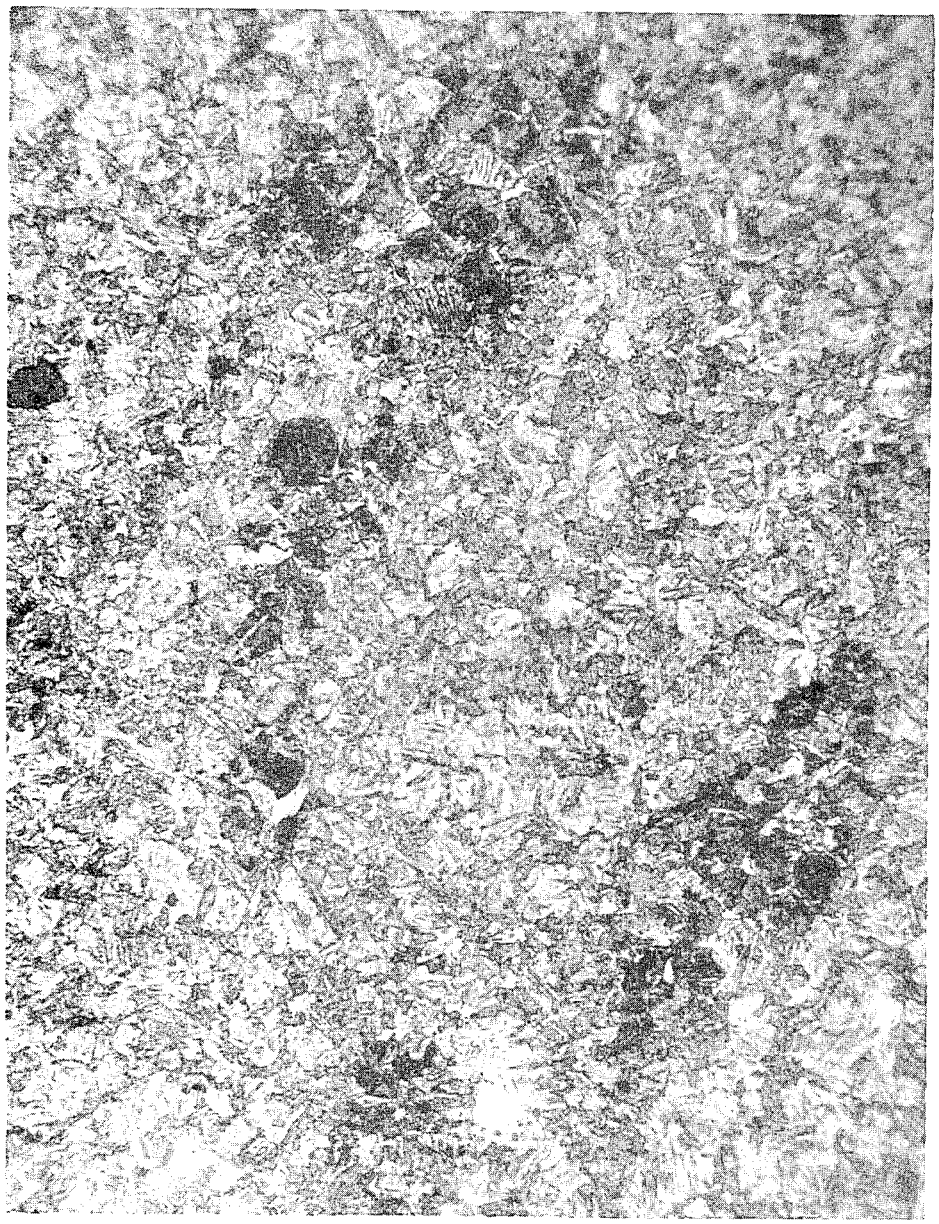
FIG. 13 is a photomicrograph of a low-carbon heat-treated similarly-etched sintered powdered metal sample made from prior nickel-content iron alloy powder "B," also under 300 diameter magnification.
Figure 14:
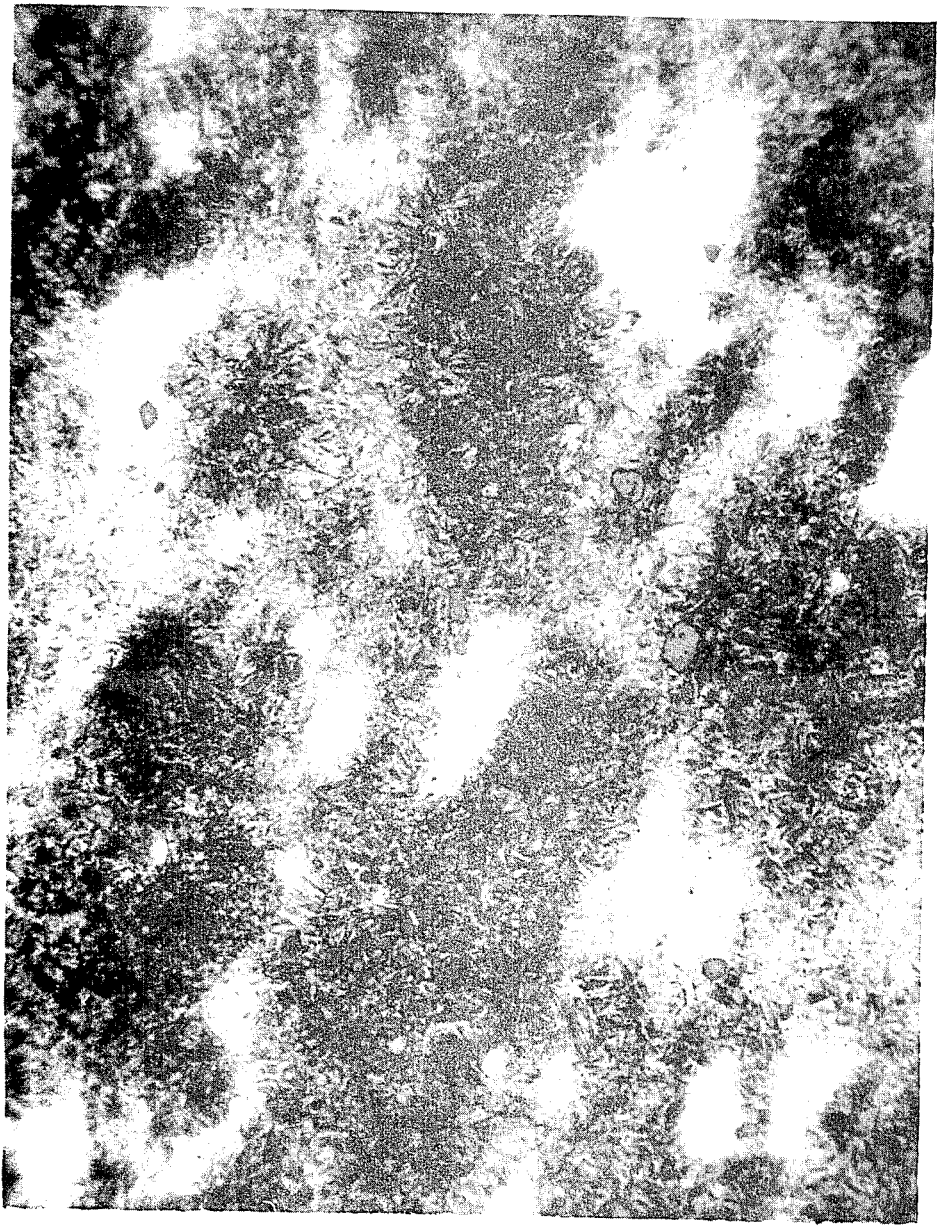
FIG. 14 is a photomicrograph of a low-carbon heat-treated similarly-etched sintered powdered metal sample made from prior nickel-content iron alloy powder "C," also under 300 diameter magnification.

(3) For regularity of microstructure, the nickel-free iron alloy powder "A" of the present invention (FIG. 12) compares favorably with the prior nickel-content iron-alloy powder "E" (FIG. 16) and is definitely superior in this respect to the other prior nickel-content iron-alloy powders "B," "C" and "D" (FIGS. 13, 14 and 15).

(4) As regards hardenability, the Jominy hardness curves of FIGS. 2 to 6 inclusive show that the nickel-free iron alloy powder "A" of the present invention is superior to prior nickel-content iron alloy powder "B," compares favorably with prior nickel-content iron alloy powders "D" and "E" and is surpassed over a considerable range of distances from the quenched end by prior nickel-content alloy "C."

(5) For tensile strength in the low-carbon range (FIG. 8), the present invention nickel-free iron alloy powder "A" is exceeded only by prior nickel-content iron alloy powders "C" and "E" and is superior to prior nickel-content alloy powders "B" and "D."

(6) For tensile strength in the high-carbon range (FIG. 9) the present invention nickel-free iron alloy powder "A" is exceeded ony by prior nickel-content alloy "B" and is superior to prior nickel-content iron alloy powders "C," "D" and "E."

(7) As regards impact performance in the low-carbon range (FIG. 10), the nickel-free iron alloy powder "A" of the present invention is markedly superior to all four of the prior nickel-content iron alloy powders "B," "C," "D" and "E," whereas in the high carbon range (FIG. 11), the present nickel-free iron alloy powder "A" is surpassed only by the prior nickel-content alloy powder "E" and is superior to the prior nickel-content iron alloy powders "B," "C" and "D."

CONCLUSION

On the basis of the evidence resulting from the foregoing tests it will be seen that the nickel-free silicon-free minimal-oxide pre-alloyed iron powder "A" of the present invention, produced by the method disclosed herein provides a generally satisfactory substitute for the much more expensive nickel-content prior iron alloy powders "B," "C," "D" and "E." At the same time, it avoids the crises in production which arise when the supply of nickel is reduced or is cut off completely.

We claim:
1. A method of making a pre-alloyed high-strength nickel-free minimal-oxide iron powder, comprising
melting together iron, manganese and molybdenum components into an alloy thereof while excluding nickel therefrom,
atomizing said alloy in a molten state into a pre-alloyed powder containing oxides of said alloy components,
sintering said pre-alloyed oxide-containing powder in a chamber containing a reducing atmosphere into an alloy body of coalesced pre-alloyed iron particles while converting said oxides into reaction products separable from said body, separating said oxide reaction products from said alloy body, and pulverizing said alloy body into substantially oxide-free pre-alloyed iron powder.

2. A method, according to claim 1, wherein said melting together is performed by heating the iron to a molten state and adding the manganese and molybdenum components to the iron while the iron is in said molten state.

3. A method, according to claim 1, wherein said oxides are converted into volatile reaction products, and wherein the separation of said oxide reaction products from said body includes withdrawing said volatile reaction products from said body.

4. A method, according to claim 1, wherein said atomizing is carried out by subjecting the molten alloy to the action of a high pressure fluid stream.

5. A method, according to claim 1, wherein said reducing atmosphere is hydrogen gas.

6. A method, according to claim 1, wherein said reducing atmosphere is dissociated ammonia gas.

7. A method, according to claim 1, including the addition of a carbon component to said substantially oxide-free pre-alloyed iron powder.

8. A method, according to claim 7, wherein said carbon component comprises graphite.

9. A method, according to claim 1, wherein the step of pulverizing said body comprises grinding up said body into preponderantly non-spherical particles.

References Cited

UNITED STATES PATENTS

| | | | |
|---|---|---|---|
| 2,289,570 | 7/1942 | Boeghold | 75—.5 BA |
| 2,909,808 | 10/1959 | Frehn | 75—.5 C |
| 3,419,383 | 12/1968 | Hatcher et al. | 75—.5 BA |
| 3,424,572 | 1/1969 | Parikh | 75—.5 BA |
| 3,551,532 | 12/1970 | Laird | 75—.5 C |
| 3,597,188 | 8/1971 | Neumann | 75—.5 C |

L. DEWAYNE RUTLEDGE, Primary Examiner

W. W. STALLARD, Assistant Examiner

U.S. Cl. X.R.

264—6